United States Patent
Lu et al.

(10) Patent No.: US 9,450,408 B2
(45) Date of Patent: Sep. 20, 2016

(54) ADAPTIVE DEMAND RESPONSE BASED ON DISTRIBUTED LOAD CONTROL

(71) Applicant: Siemens Corporation, Iselin, NJ (US)

(72) Inventors: Yan Lu, West Windsor, NJ (US);
Siyuan Zhou, Dayton, NJ (US);
Mohammad Abdullah Al Faruque, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 506 days.

(21) Appl. No.: 13/644,404

(22) Filed: Oct. 4, 2012

(65) Prior Publication Data
US 2013/0090777 A1    Apr. 11, 2013

Related U.S. Application Data

(60) Provisional application No. 61/544,401, filed on Oct. 7, 2011.

(51) Int. Cl.
*H02J 3/14* (2006.01)

(52) U.S. Cl.
CPC .............. *H02J 3/14* (2013.01); *Y02B 70/3225* (2013.01); *Y02B 70/3283* (2013.01); *Y04S 20/222* (2013.01); *Y04S 20/224* (2013.01); *Y04S 20/246* (2013.01)

(58) Field of Classification Search
CPC .. Y04S 10/545; Y04S 20/221; Y04S 20/222; Y04S 20/224; Y04S 20/227; Y04S 20/228; Y04S 20/244; Y04S 20/246; Y02B 20/48; Y02B 70/3216; Y02B 70/3225; Y02B 70/3241; Y02B 70/325; Y02B 70/3275; Y02B 70/3283; H02J 3/14; G06Q 10/0637; G06Q 50/06; G06Q 50/163; F24F 2011/0046; F24F 2011/0047; F24F 2011/0068; F24F 2011/0075; Y02E 10/563; Y02E 10/566; Y02E 10/763; Y02E 40/76; G05B 2219/2642; H04L 12/2823; H04L 67/125; G01D 4/004; G06F 1/26; H05B 37/0245

USPC ............. 700/11, 19, 22, 275, 276, 286, 291, 700/295, 297; 705/400, 412
See application file for complete search history.

(56) References Cited

U.S. PATENT DOCUMENTS

| 7,565,227 | B2 | 7/2009 | Richard et al. |
| 8,239,073 | B2 | 8/2012 | Fausak |

(Continued)

FOREIGN PATENT DOCUMENTS

EP    2287991 A1    2/2011

OTHER PUBLICATIONS

PCT International Search Report mailed May 12, 2014 corresponding to PCT International Application No. PCT/US2012/058903 filed Oct. 5, 2012 (9 pages).
"Assessment of Demand Response and Advanced Metering," FERC report, Sep. 2007.

(Continued)

*Primary Examiner* — Crystal J Barnes-Bullock

(57) ABSTRACT

Adaptive demand response based on distributed load control may be provided. A demand response request indicative of a demand response event for an area may be received. A maximum power consumption for the area during the demand response event may be determined based on the demand response request. One or more set points for the area during the demand response event may be determined prior to the demand response event. The one or more set points are determined based on the maximum power consumption. Prior to or during the demand response event, a real-time power consumption for the area may be calculated. When the real-time power consumption exceeds the maximum power consumption, one or more loads in the area may be controlled to maintain the real-time power consumption at or below the maximum power consumption.

17 Claims, 3 Drawing Sheets

(56) References Cited

U.S. PATENT DOCUMENTS

| | | | |
|---|---|---|---|
| 8,406,933 B2* | 3/2013 | Nagel et al. | 700/286 |
| 8,412,654 B2* | 4/2013 | Montalvo | H02J 3/14 |
| | | | 307/31 |
| 8,600,556 B2* | 12/2013 | Nesler et al. | 700/275 |
| 8,738,193 B2* | 5/2014 | Furuichi et al. | 700/295 |
| 8,761,944 B2* | 6/2014 | Drew et al. | 700/276 |
| 8,880,232 B2* | 11/2014 | Parsons | 700/295 |
| 8,886,363 B2* | 11/2014 | Matthews et al. | 700/295 |
| 8,918,221 B2* | 12/2014 | Le Roux et al. | 700/291 |
| 8,930,037 B2* | 1/2015 | Brian et al. | 700/295 |
| 9,002,761 B2* | 4/2015 | Montalvo | 706/15 |
| 9,072,133 B2* | 6/2015 | Chemel | F21S 2/005 |
| 9,177,323 B2* | 11/2015 | Forbes, Jr. | G06Q 10/00 |
| 2010/0088261 A1 | 4/2010 | Montalvo | |
| 2011/0046806 A1 | 2/2011 | West | |
| 2011/0202467 A1* | 8/2011 | Hilber | G06Q 50/188 |
| | | | 705/80 |
| 2012/0083927 A1* | 4/2012 | Nakamura et al. | 700/278 |
| 2012/0232701 A1* | 9/2012 | Carty | G05B 15/02 |
| | | | 700/277 |
| 2012/0271460 A1* | 10/2012 | Rognli | 700/276 |
| 2015/0120075 A1* | 4/2015 | Le Roux et al. | 700/296 |

OTHER PUBLICATIONS

"A National Assessment of Demand Response Potential," FERC report, prepared by The Brattle Group, Freeman, Sullivan & Co., and Global Energy Partners, LLC, Jun. 2009.

S. Lu et al., "Centralized and Decentralized Control for Demand Response," Innovative Smart Grid Technologies (ISGT), 2011 EIII PES, Jan. 2011.

J. Wang et al., "Case Studies of Smart Grid Demand Response Programs in North America," Innovative Smart Grid Technologies (ISGT), 2011, IEEE PES, 2011, pp. 1-5.

National Institute of Standards and Technology, NIST Framework and Roadmap for Smart Grid Interoperability Standards, Release 1.0, Special Pub. 11008, Jan. 2010.

http://www.coned.com/documents/elec/158q-158r8.pdf.

S. Kiliccote et al., "Dynamic Controls for Energy Efficiency and Demand Response: Framework Conecepts and a New Construction Study Case in New York," Proceedings of the 2006 ACEEE Summer Study on Energy Efficiency in Buildings, Pacific Grove, CA, Aug. 2006.

Report of Examination mailed Mar. 2, 2016; Chinese Patent Application No. 201280058210.5; 24 pages.

* cited by examiner

ADAPTIVE DEMAND RESPONSE BASED ON DISTRIBUTED LOAD CONTROL

RELATED APPLICATIONS

The present patent application claims the benefit of the filing date under 35 U.S.C. §119(e) of Provisional U.S. Patent Application Ser. No. 61/544,401, filed Oct. 7, 2011, which is hereby incorporated by reference herein.

BACKGROUND

The present embodiments relate to demand response.

Demand response typically involves the curtailment of electrical usage (i.e., power consumption) during a demand response event (e.g., 4 hours, 1 day, other time periods). Demand response schemes may be implemented in response to changes in the price of electricity and/or incentive payments and/or lower rates offered by the energy utility to end-users to, for example, induce lower electricity usage at peak times or when system reliability is jeopardized.

Known demand response schemes attempt to curtail electrical usage and achieve the required demand response by applying pre-calculated (i.e., calculated before the demand response event) load shedding requirements to centralized systems, such as a centralized lighting system and a heating, ventilation, and air conditioning (HVAC) system. For example, a demand response event may require that the end-user reduce power consumption for an area by 50 kW between 2:00 P.M. and 6:00 P.M. on a specific day during the summer. In response, the demand response scheme, using a central controller, will pre-determine a control strategy for how best to reduce power consumption for the area by 50 kW. This may involve raising one or more temperatures in the HVAC system by a few degrees and/or turning off the lights in certain portions of the area. The pre-determined control strategy will then be applied to the HVAC system and the centralized lighting system during the requisite time frame (in this case, between 2:00 P.M. and 6:00 P.M.).

Known demand response schemes may, despite the implementation of the pre-determined control strategy, nonetheless fail to satisfy the load shedding requirements set forth by the demand response agreement or policy. This may be due to unanticipated temperature changes (requiring, for example, that the one or more temperatures in the HVAC system be changed contrary to the control strategy and/or that the HVAC system be in active mode during most of that time), unexpected activity in the area (e.g., such as an impromptu meeting), or for other reasons. This may, alternatively or additionally, be the result of fluctuations in electricity usage during the demand response due to, for example, distributed loads.

BRIEF SUMMARY

In order to improve the likelihood of meeting load requirements during a demand response event, properly consider the comfort of users in an area subjected to a demand response scheme, and adequately account for fluctuations in electricity usage during a demand response event, adaptive demand response based on distributed load control is provided.

In a first aspect, a method for providing adaptive demand response based on distributed load control is provided. A demand response request indicative of a demand response event for an area may be received. A maximum power consumption for the area during the demand response event may be determined based on the demand response request. One or more set points for the area during the demand response event may be determined prior to the demand response event. The one or more set points are determined based on the maximum power consumption. Prior to or during the demand response event, a real-time power consumption for the area may be calculated. When the real-time power consumption exceeds the maximum power consumption, one or more distributed loads in the area may be controlled to maintain the real-time power consumption at or below the maximum power consumption.

In a second aspect, a non-transitory computer-readable storage medium that stores instructions executable by one or more processors for providing adaptive demand response for an area is provided. The instructions include instructions for receiving a demand response request indicative of a demand response event for the area. The demand response event is indicative of a load shedding goal for the area. The instructions include instructions for determining, prior to the demand response event, one or more set points for the area based on the load shedding goal. The instructions include instructions for calculating, prior to or during the demand response event, the real-time power consumption of the area. The real-time power consumption of the area is based, at least in part, on the one or more set points for the area. The instructions further include instructions for controlling, when the real-time power consumption does not satisfy the load shedding goal for the area, one or more distributed loads in the area to satisfy the load shedding goal for the area.

In a third aspect, a system of providing adaptive demand response for an area may be provided. The system includes a first controller and a plurality of distributed load controllers operatively connected to the first controller. The first controller is configured to receive a demand response request indicative of a demand response event for the area, determine, based on the demand response event, a maximum power consumption for the area during the demand response event, determine, prior to the demand response event, one or more set points for the area during the demand response event, the one or more set points determined based on the maximum power consumption; calculate, prior to or during the demand response event, a real-time power consumption by the area, generate, when the real-time power consumption exceeds the maximum power consumption, control instructions to control a plurality of distributed loads in the area to maintain the real-time power consumption at or below the maximum power consumption, and transmit the control instructions to the plurality of gateway controllers. The gateway controllers are configured to receive the control instructions and to control a plurality of devices or systems associated with the plurality of distributed loads.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The present embodiments generally relate to providing adaptive demand response for an area. Unlike known demand response schemes, which only utilize a pre-determined demand response control strategy, the disclosed embodiments utilize a pre-determined demand response control strategy in combination with an adaptive demand response system. By only utilizing a pre-determined demand response control strategy, known demand response schemes may fail to satisfy load shedding goals for a demand response event when, for example, unexpected activities or fluctuations in energy usage occur. Beneficially, the adaptive demand response system allows the present embodiments to satisfy the load shedding goals for a demand response event by adapting to these unexpected activities or fluctuations in energy usage.

Figure 1:
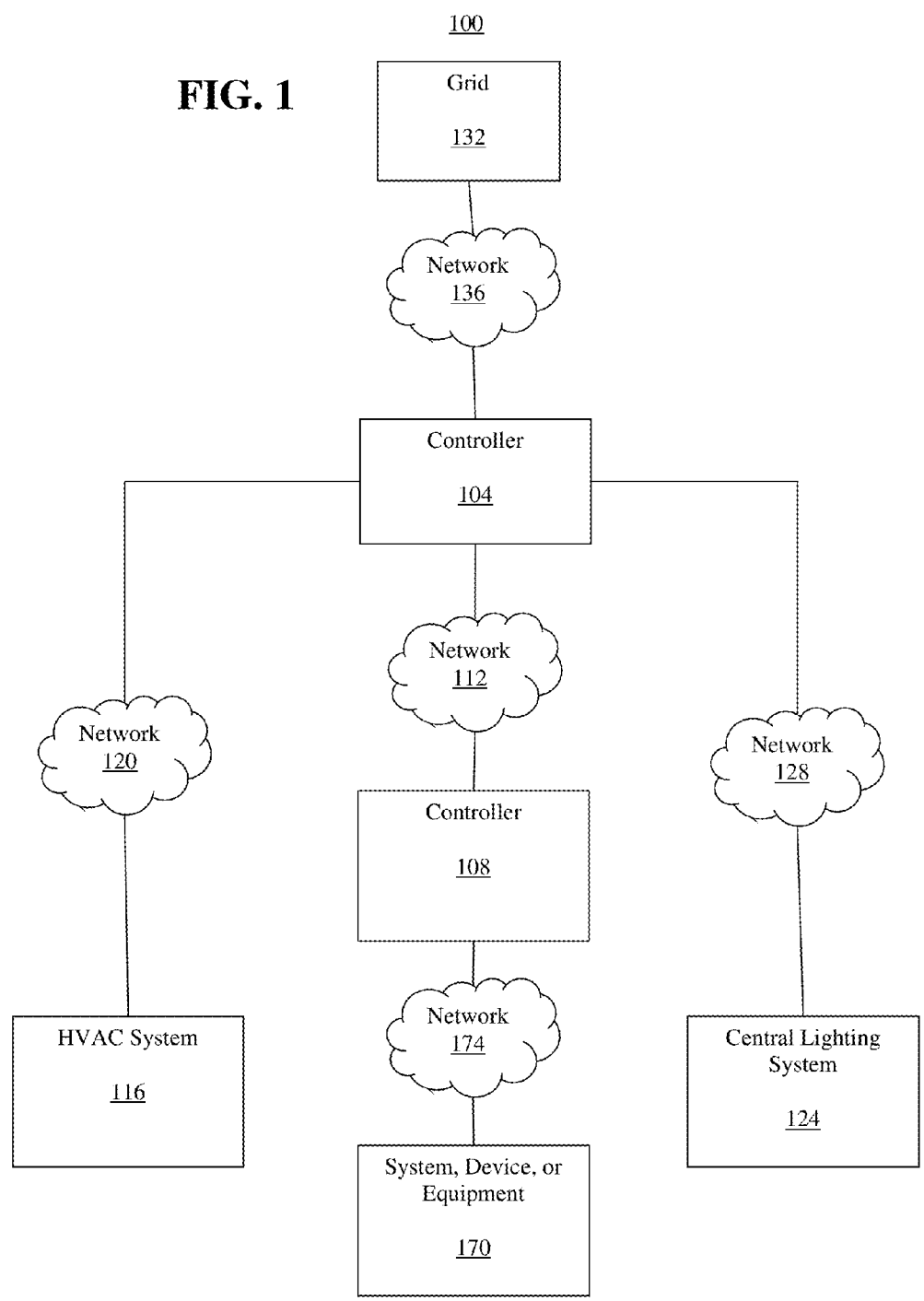
FIG. 1 is a block diagram of a system for providing adaptive demand response for an area.

FIG. 1 depicts a system 100 for providing adaptive demand response based on distributed load control for an area. The system 100 generally includes a controller 104 coupled to or in communication with one or more gateway controllers 108 via a communications network 112, with one or more HVAC systems 116 of or for the area via a communications network 120, with one or more central lighting systems 124 of or for the area via a communications network 128, and with an electric grid 132 to the area via a communications network 136. In other embodiments, the system 100 may include additional, different, or fewer components. For example, the controller 104 may control loads other than lighting and/or HVAC. As another example, one or more components may be directly connected without using one or more of the networks 112, 120, 128, and/or 136.

The area may be or correspond to a residence, a building (e.g., an office, a hotel, a hospital), a plurality or group of buildings, a site (e.g., a campus) that includes one or more buildings, a microgrid, or any other area. For example, the area may be an office building, warehouse, and/or manufacturing facility. The area generally includes one or more control zones that correspond to a sub-area, such as a room, floor, building, of the area. When, for example, the area is a campus that includes a plurality of buildings, the area may include a plurality of control zones.

The controller 104 generally includes a processor, a memory, and a communications interface. In other embodiments, the controller 104 may include additional, fewer, or different components. The controller 104 may be located or positioned anywhere in the area (e.g., at a building in the area) or may be remotely located from (e.g., outside of) the area. In one embodiment, the controller 104 is a central controller, control workstation, engineering station, or other supervisory controller for implementing reaction to or responding to a demand response event.

The processor may be a general processor, a digital signal processor, ASIC, field programmable gate array, graphics processing unit, analog circuit, digital circuit, combinations thereof, or other now known or later developed processor. The memory may be a volatile memory or a non-volatile memory. The memory may include one or more of a read only memory (ROM), random access memory (RAM), a flash memory, an electronic erasable program read only memory (EEPROM), or other type of memory. The memory may include an optical, magnetic (hard drive) or any other form of data storage device.

The communications interface is provided to enable or facilitate electronic communication between the controller 104 and the one or more gateway controllers 108, the one or more HVAC systems 116, the one or more lighting systems 124, and/or the grid 132 via the networks 112, 120, 128, and/or 136, respectively. The communications interface may include any number of ports. In one embodiment, the communications interface includes four interfaces, such as a communications interface devoted to transmitting and/or receiving signals, control instructions or commands, datagrams, data, packets, or information to/from the one or more gateway controllers 108, a communications interface devoted to transmitting and/or receiving signals, control instructions or commands, datagrams, data, packets, or information to/from the one or more HVAC systems 116, a communications interface devoted to transmitting and/or receiving signals, control instructions or commands, datagrams, data, packets, or information to/from the one or more lighting systems 124, a communications interface devoted to transmitting and/or receiving signals, requests (e.g., demand response requests), datagrams, data, packets, or information to/from the grid 132. In alternative embodiments, a same interface may be used for communicating with different components.

As noted above, the system 100 generally includes the one or more distributed or local controllers 108 assigned to or associated with one or more control zones, respectively, of the area. In some embodiments (e.g., when the area includes one control zone), the system 100 includes one gateway controller 108 for the control zone in the area. In other embodiments (e.g., when the area includes a plurality of control zones), the system 100 includes a plurality of gateway controllers 108 for the plurality of control zones, respectively, in the area. In these embodiments, one gateway controller 108 is assigned or associated with each control zone of the plurality of control zones. In yet other embodiments, the controller 104 performs the functions of the local controller 108 so that no or fewer local controllers 108 are used.

Each gateway controller 108 generally includes a processor, a memory, and a communications interface. The processor and the memory of each controller 108 may be the same as or different than the processor and the memory of the controller 104. The communications interface is provided to enable or facilitate electronic communication between the controller 108 and the controller 104 via the network 112. The communications interface is devoted to transmitting and/or receiving signals, control instructions or commands, datagrams, data, packets, or information to/from the controller 104. In some embodiments, the communications interface may also enable or facilitate electronic communication between the controller 108 and one or more other controllers 108 via a network, such as the networks 112, 120, 128, 136, or another network.

Each of the gateway controllers 108 is coupled to and operable to control, any devices, systems, and/or equipment 170 positioned or located within the control zone for that respective controller 108. Each controller 108 is coupled to or in communication with devices, systems, and/or equipment via one or more networks 174. The devices, systems, and/or equipment 170 may include lights (e.g., reading lamps) not connected to or a part of the one or more lighting systems 124, office equipment (e.g., printers), computers (e.g., laptops, desktops), elevators, escalators, household appliances (e.g., refrigerators), pumps, electrical motors, pneumatic systems, other devices, systems, and/or equipment, or combinations thereof. The energy used by the one or more devices, systems, and/or equipment 170 is generally referred to as a plug or plug-in load. The plug-in loads in each control zone are thus controlled by the gateway controller 108 for that control zone.

The networks 112, 120, 128, 136, 174, may be wireless networks, wired networks, or combinations of a wired and wireless network, such as an 802.11 x compliant network, and may include publicly accessible networks, such as the Internet, private networks, or combinations thereof. In some embodiments, one or more of the networks 112, 120, 128, 136, 174 may be the same. In one embodiment, the networks 112, 120, 128, 136, 174 are one network used for different communications interconnections. The type and configuration of the communications networks 112, 120, 128, 136, 174 are implementation dependent, and any type of communications network which facilitates the described communications between the controller 104 and the one or more gateway controllers 108, the HVAC system 116, the lighting system 124, and the energy utility 132, available now or later developed, may be used.

As noted above, the system 100 generally includes the one or more HVAC systems 116 and the one or more central lighting systems 124. In some embodiments, such as when the area is or corresponds to one building, the system 100 includes only one HVAC system 116 and only one central lighting system 124. In other embodiments, however, such as when the area corresponds to a campus or a larger building, the system 100 includes a plurality of HVAC systems 116 and a plurality of central lighting systems 124. Each building or control zone may have a dedicated HVAC system 116 and a dedicated central lighting system 124.

The grid 132 is an electricity grid, such as a smart grid, that provides or supplies the area with electricity. The grid 132 is associated with a demand response system or program established by the power provider, power distributor, power regulator, or other grid related entity involved in providing the electricity over or using the grid. Pursuant to the demand response system or program, the entity associated with the grid 132 may periodically issue or transmit demand response requests to participating customers or end-users. These demand response requests may be issued in emergency situations, in times of high or peak demand (e.g., when it's extremely hot or cold), and/or when electricity prices are high. So long as the participating customer complies with the demand response request, the utility company or other entity involved in providing the electricity over the grid 132 may provide the customer with incentives (e.g., payments) and/or reduced electricity rates.

Figure 2:
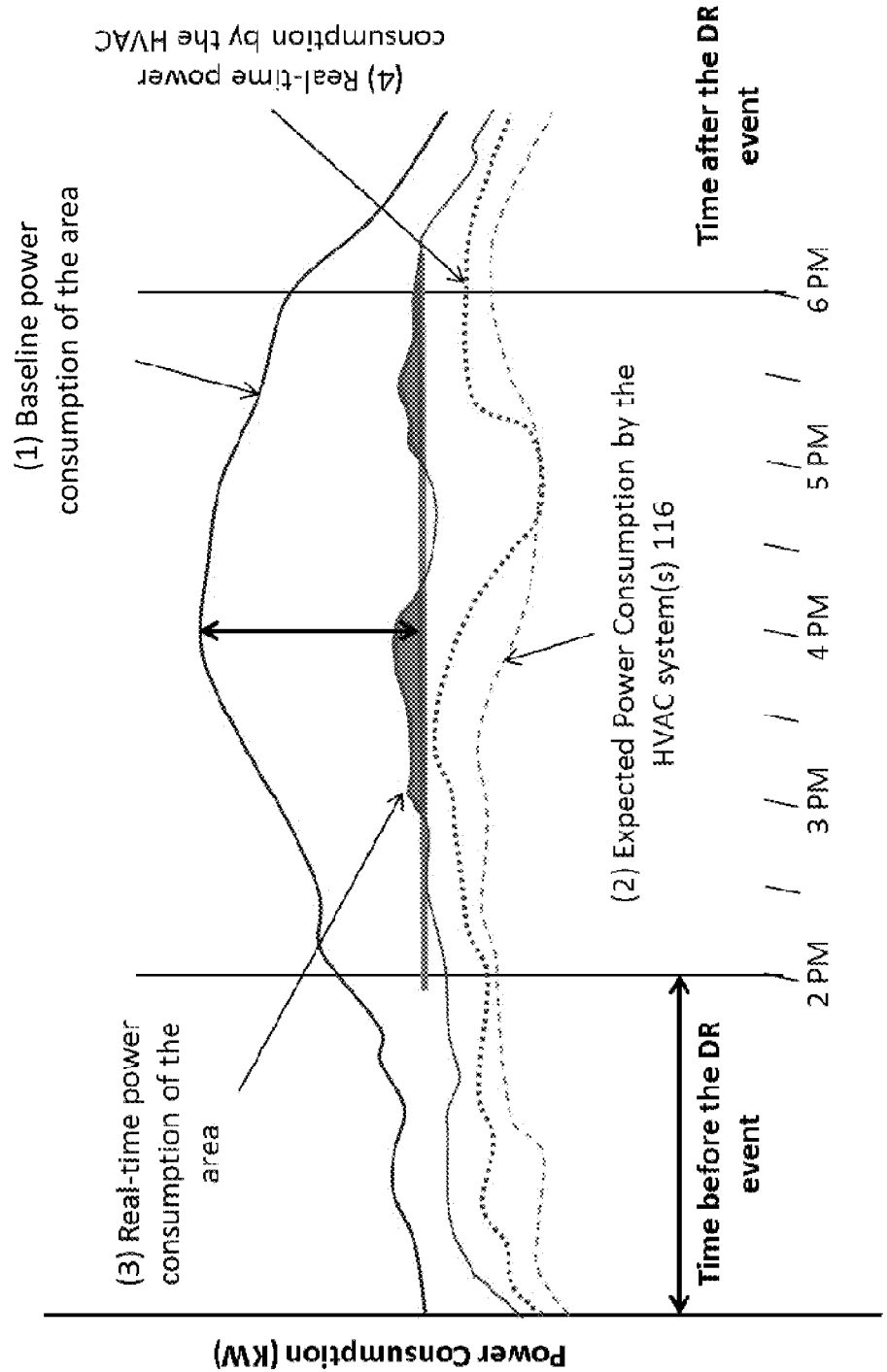
FIG. 2 illustrates a plurality of power consumption graphs for the area.

With reference to FIG. 2, graph (1) depicts baseline power consumption for the area. In other words, graph (1) depicts the normal power consumption, without any sort of demand response, for the area. As shown in FIG. 2, the power consumption for the area is relatively high between 2:00 and 6:00 P.M., with a peak amount of power consumed around 4:00 P.M. Recognizing this, a demand response request for the area is transmitted or sent. The operator of the loads for the area has registered with or agreed to participate in the demand response program.

Accordingly, the controller 104, which, as noted above, is in communication with the entity for the grid 132, is operative to receive the demand response request. The demand response request is indicative of a demand response event for the area. The demand response event corresponds to a reduction in power consumption or energy usage (i.e., demand response) over, during, or for a specified amount of time (e.g., 1, 2, 8 hours). In other words, the demand response event includes a load shedding goal or requirement (e.g., 50 kW) over, during, or for the specified amount of time. Demand response events often correspond to a reduction in power consumption or energy usage for a specified amount of time during peak periods of energy usage. For example, the demand response event may correspond to a 1 kW reduction in energy usage between the hours of 2:00 P.M. and 6:00 P.M. on a hot July day. Demand response events may, in some cases, be periodic events (e.g., once a month), or may occur more frequently (e.g., every day in the summer) or less frequently (e.g., once a year).

The demand response request may be transmitted to and received by the controller 104 at any point prior to the scheduled demand response event. In some embodiments, the demand response request is received by the controller 104 one day prior to the demand response event. In other embodiments, the demand response request is transmitted to and received by the controller 104 several hours, weeks, or months prior to the demand response event. In yet other embodiments, the demand response request is transmitted to and received by the controller 104 for immediate implementation.

Based on the demand response request, and, more particularly, the power or energy reduction (i.e., load shedding) required by the demand response event, the controller 104 is operative to determine, prior to implementing the demand response event, how much energy consumption must be reduced in the area to comply with the load shedding requirement. In other words, the controller 104 is operative to determine the amount of load shedding that must occur in the area. Stated yet another way, the controller 104 is operative to determine a maximum power consumption for the area during the demand response event. This maximum power consumption is the maximum power that may be consumed while the load shedding goals of the demand response event are still satisfied.

Prior to the demand response event (e.g., 1 day before the event), the controller 104 is operative to determine the optimal distribution or allocation of the load shedding (i.e., reduction in power consumption) in the area. To this end, the one or more gateway controllers 108 collect or gather relevant information or data, such as user preferences, activity schedule information, and/or other information or data, from the one or more devices, systems, and/or equipment 170. The one or more gateway controllers 108 may also collect or gather relevant information or data, such as temperature or humidity level, from one or more sensors positioned or located in the area (e.g., in one or more of the control zones). The one or more gateway controllers 108 may obtain additional or different information as well, such as, for example, lighting levels in the control zone, and, thus, the area. The one or more gateway controllers 108 may collect information automatically (e.g., at pre-determined intervals) or in response to a request from the controller 104.

Once the information has been collected, the one or more gateway controllers 108 are operative to transmit the information to the controller 104. The controller 104 receives this information from the one or more gateway controllers 108, and may, additionally, obtain or receive weather data, such as forecast information, for the area. Based on the received information (e.g., user preferences, temperature, activity schedules, weather data) and the load shedding goal set forth by the demand response event (i.e., the maximum power consumption for the area), the controller 104 is operable to determine or calculate, using an optimization (e.g., cost function) algorithm, one or more set points for the one or more HVAC systems 116 in the area.

More specifically, the controller 104 is operable to determine or calculate one or more temperature, pressure, humidity, and other set points for the one or more HVAC systems 116. In the embodiments in which the area includes one HVAC system 116, the controller 104 may calculate temperature, pressure, humidity, other, or combinations thereof, set points for the HVAC system 116. In the embodiments in which the area includes a plurality of HVAC systems 116 for the area, the controller 104 may calculate temperature, pressure, humidity, other, or combinations thereof, set points for each of the HVAC systems 116. Alternatively or additionally, one or more gateway controllers 108 calculate set points. The one or more set points for the one or more HVAC systems 116 are calculated prior to the demand response event. The calculation may be pre-determined before receiving the demand response request or may be performed in response to receiving the demand response request. In some embodiments, the one or more set points for the one or more HVAC systems are calculated one day prior to the demand response event. In other embodiments, however, the one or more set points may be calculated at a different time (e.g., 4 hours) prior to the demand response event.

With reference again to FIG. 2, graph (2) depicts the expected or predicted power consumption for the one or more HVAC systems calculated or determined by the controller 104. The expected power consumption is calculated based on a pre-demand response event simulation using or with the one or more calculated set points. Since the power consumption by the one or more HVAC systems 116 accounts or is responsible for a large percentage of the total power consumption of the area, the expected power consumption for the one or more HVAC systems 116 is important. The expected power consumption for the one or more HVAC systems 116, when added to the power consumption by the rest of the systems or devices in the area should be less than the maximum power consumption. In other words, when combined, the expected power consumption for the one or more HVAC systems 116 and the power consumption by the rest of the systems or devices in the area should allow the area to satisfy the load shedding goals of the demand response event.

After the one or more set points have been calculated, but still prior to the demand response event, the controller 104 implements the pre-determined or pre-calculated HVAC strategy. In other words, the controller 104 controls or configures the one or more HVAC systems 116 according to or based on the one or more set points previously calculated. For example, when the area includes one building and one HVAC system 116 for the building, the controller 104 controls the HVAC system 116 based on the previously calculated one or more set points (e.g., temperature and humidity set points). The controller 104 may control or configure the one or more HVAC systems 116 at any time prior to the demand response event. In some embodiments, this happens several hours prior to the demand response event (e.g., if the demand response event corresponds to load shedding between 2:00 P.M. and 6:00 P.M., this may happen in the morning on the same day). In other embodiments, this may happen at different times prior to the demand response event and/or may happen at pre-determined times (e.g., every morning) The configuration may occur upon initiation of the demand response event.

The controller 104 is operative to calculate or measure, prior to the start of the demand response event and/or during the demand response event, the real-time power consumption of the area. In other words, the controller 104 is operative to calculate the power currently being consumed or recently consumed by the area, including the one or more HVAC systems 116. The controller 104 may calculate or measure the real-time power consumption by reading one or more meters in the area. In the embodiments in which the area is large (e.g., the area is a campus), the area may include a plurality of meters. In other embodiments, however, such as when the area only includes one building, the area may only include one meter.

By measuring the real-time power consumption of the area, the controller 104 is able to determine whether the load shedding goal of the demand response event is being met (if the real-time power consumption is measured during the demand response event) or would be met (if the real-time power consumption is measured prior to the demand response event). The controller 104 may, for example, directly compare the real-time power consumption of the area with the maximum power consumption allowable to satisfy the load shedding goal of the demand response event. Instead of adapting based on instantaneous measurements, trends may be observed and used to adapt while also avoiding exceeding the maximum.

When the real-time power consumption of the area is less than and/or the real-time power consumption of the area is not trending to be greater than the maximum power consumption, and so long as this is true, the controller 104 takes no further action (i.e., the controller 104 does not control the distributed loads). In some situations, however, the real-time power consumption of the area is greater than the maximum power consumption (i.e., the load shedding goal of the demand response event is not being met or would not be met). With reference again to FIG. 2, graph (3) depicts such a scenario during the demand response event. As shown by graph (3), the real-time power consumption of the area is greater than the maximum power consumption (depicted by the solid and constant line).

This is often due, at least in part, to the one or more HVAC systems 116 consuming more power than expected. In FIG. 2, graph (4) depicts power consumption by the one or more HVAC systems 116 in excess of the expected power consumption (graph (2)). The one or more HVAC systems 116 may consume more power than expected because of or due to the weather. For example, hotter than forecast temperatures may force the one or more HVAC systems 116 to be in active mode throughout the day, thereby causing the one or more operating points, such as the temperature, of the one or more HVAC systems 116 to be higher than previously calculated and set by the controller 104. Thus, the one or more HVAC systems 116 consume more power than expected.

The real-time power consumption of the area may also be greater than the maximum power consumption at one or more points in time due to or because of the fluctuating nature of electrical usage by persons in the area. In other words, distributed loads, such as plug-in loads from the one or more systems, devices, or equipment 170 and/or lighting loads from the one or more central lighting systems 124, may cause the real-time power consumption of the area to be higher than the maximum power or consumption at one or more points in time. This makes it difficult for the area to continually satisfy the load shedding goals for the entire duration of the demand response event. As described above, known demand response schemes do not account for or adapt to these distributed loads.

In the disclosed embodiments, however, when the real-time power consumption of the area is greater than or trending to be greater than the maximum power consumption, and so long as this is true, the controller 104 controls one or more distributed loads in the area to maintain the real-time power consumption at or below the maximum power consumption. The controller 104 controls the one or more distributed loads by allocating load shedding, equal to the difference between the real-time power consumption and the maximum power consumption, to the central lighting system 124 and/or the devices, systems, and/or equipment 170 responsible for or associated with the distributed loads. This generally involves some combination of allocating power to, allocating load shedding (i.e., reducing power available to), or shutting off power to the central lighting system 124 and/or the devices, systems, and/or equipment 170 responsible for the distributed loads. As noted above, the distributed loads may include plug-in loads from the systems, devices, and/or equipment 170, such as lights not connected to or a part of the one or more lighting systems 124, office equipment (e.g., printers), computers (e.g., laptops, desktops), elevators, escalators, household appliances (e.g., refrigerators), other devices, systems, and/or equipment. The distributed loads may, alternatively or additionally, include loads from lights connected to the one or more central lighting systems 124. Accordingly, the controller 104 controls the one or more distributed loads by allocating power to, allocating power away from (i.e., reducing available power to), or shutting off power to the central lighting system 124 and/or the systems, devices, and/or equipment 170 responsible for the one or more plug-in loads when the real-time power consumption of the area is greater than or is trending to be greater than the maximum power consumption. In some embodiments, the reduction may partially or wholly come from reducing other loads, such as further changing set points for the one or more HVAC systems 116.

The controller 104 controls the one or more central lighting systems 124 by directly issuing or transmitting commands or control instructions to one or more of the central lighting systems 124 via the network 128. The commands or control instructions may include a maximum power consumption for the respective central lighting system 124, an instruction to reduce power consumption, an instruction that greater power consumption is permitted, the real-time and/or historical power consumption of the respective central lighting system 124 and/or other central lighting systems 124, a control status of the respective central lighting system 124 and/or other central lighting systems 124, other instructions or commands, or combinations thereof.

The controller 104 controls the one or more plug-in loads by issuing or transmitting commands or control instructions to the one or more gateway controllers 108 via the network 112, which are, in turn, coupled to the one or more plug-in loads in the area via the network 174. The commands or control instructions may include a maximum power consumption for the respective gateway controller 108, an instruction to reduce power consumption, an instruction that greater power consumption is permitted, the real-time and/or historical power consumption of the respective gateway controller 108 and/or other gateway controllers 108, a control status of the respective gateway controller 108 (and one or more plug-in loads coupled thereto) and/or other gateway controllers 108 (and one or more plug-in loads coupled thereto), other instructions or commands, or combinations thereof.

The controller 104 generally controls the one or more distributed loads in the area (and the one or more control zones therein) based on, for example, occupancy information in the area or specific control zones therein, activity schedule(s) for the area or control zones therein, user input or preferences, or combinations thereof, obtained by the one or more gateway controllers 108 and/or the one or more central lighting systems 124. The controller 104 may obtain the occupancy information, activity schedule(s), user input or preferences, or combinations thereof, by request or automatically. In one embodiment, the controller 104 initiates a bid request to the one or more gateway controllers 108 and/or the one or more central lighting systems 124, and the occupancy information, activity schedule(s), user input or preferences, or combinations thereof may be sent by the controllers 108 and/or lighting systems 124 in response or as part of the response to the bid request.

Occupancy information may be collected or obtained by the one or more gateway controllers 108 and/or the one or more central lighting systems 124 in any number of ways. The one or more gateway controllers 108 and/or the one or more central lighting systems 124 may be, for example, coupled to one or more occupancy or motion sensors in one or more of the control zones in the area. The occupancy or motion sensors could, in turn, detect the presence of one or more users in one or more of the control zones. Conversely, the occupancy or motion sensors could, in turn, detect that no one is presently located in one or more of the control zones. In the latter situation, the controller 104 may direct the one or more central lighting systems 124 to shut off the light(s) in the one or more control zones in which no one is present.

Likewise, the one or more gateway controllers 108 and/or the one or more central lighting systems 124 may request and receive (or just receive) input and/or user preferences from one or more users in the area. The input may be indicative of the one or more users' occupancy in the one or more control zones in the area. For example, the one or more gateway controllers 108 may request that the user of a computer respond (to indicate that they are there) within a specified period of time (e.g., 5 minutes). If the user(s) respond(s), the one or more controllers 108 will assume that the user(s) is (are) there and is (are) using the computer. If, however, the user(s) do(es) not respond, the one or more controllers 108 will assume that the user(s) is (are) not there and may switch the power source corresponding computer(s) from AC to battery (assuming the battery has a pre-determined level of power). The user preferences may correspond to user preferences for lighting levels, power/sleep schedules (e.g., for computers), and/or other preferences of or for one or more users. If the user preferences indicate, for example, that the user is okay with keeping lighting levels as low as possible, the controller 104 may respond accordingly.

The activity schedule(s) for the area may indicate that one or more control zones (or portions thereof) are being or will be used at certain times. If, for example, the activity schedule indicates that an all-day conference is taking place in one of the control zones, the controller 104 will not shut off or reduce (and may in fact permit an increase in) distributed loans for that control zone. The activity schedule for the area may be obtained at any time (e.g., one day previous, only when needed, etc.)

The controller 104 may calculate the real-time power consumption of the area and control the one or more distributed loads in the area before and periodically throughout the demand response event. The controller 104 may calculate and, when appropriate (e.g., the real-time power consumption is greater than the maximum power consumption) control, automatically, such as at pre-defined time intervals (e.g., every 15 minutes, or in response to a request or user input. This allows the controller 104 to adaptively respond to changes in occupancy information, activity schedule(s), user input/preferences, and overall load requirements in the system 100. In some embodiments, this may involve shifting load allocations to/from/between the one or more central lighting systems 124, the one or more HVAC systems 116, and/or the equipment, devices, or systems 170 responsible for the one or more distributed loads. Once, however, the demand response event is over, the one or more distributed loads may return to their pre-demand response event state or other ongoing or non-demand response state.

By controlling the one or more distributed loads in the manner described herein, the controller 104 is able to account for and remedy the difference between the real-time power consumption and the maximum power consumption. In other words, the controller 104 is able to assist in rectifying the deficiencies or shortcomings associated with known demand response schemes, which typically rely only on a pre-determined demand response event strategy that may, in some cases, fail to satisfy the load shedding goals of a demand response event. At the same time, by continually monitoring the real-time power consumption and controlling the one or more distributed loads, the controller 104 provides adaptive demand response that effectively considers and adapts to the fluctuating nature of users' electricity usage, reflected in the fluctuating nature of distributed loads.

Figure 3:
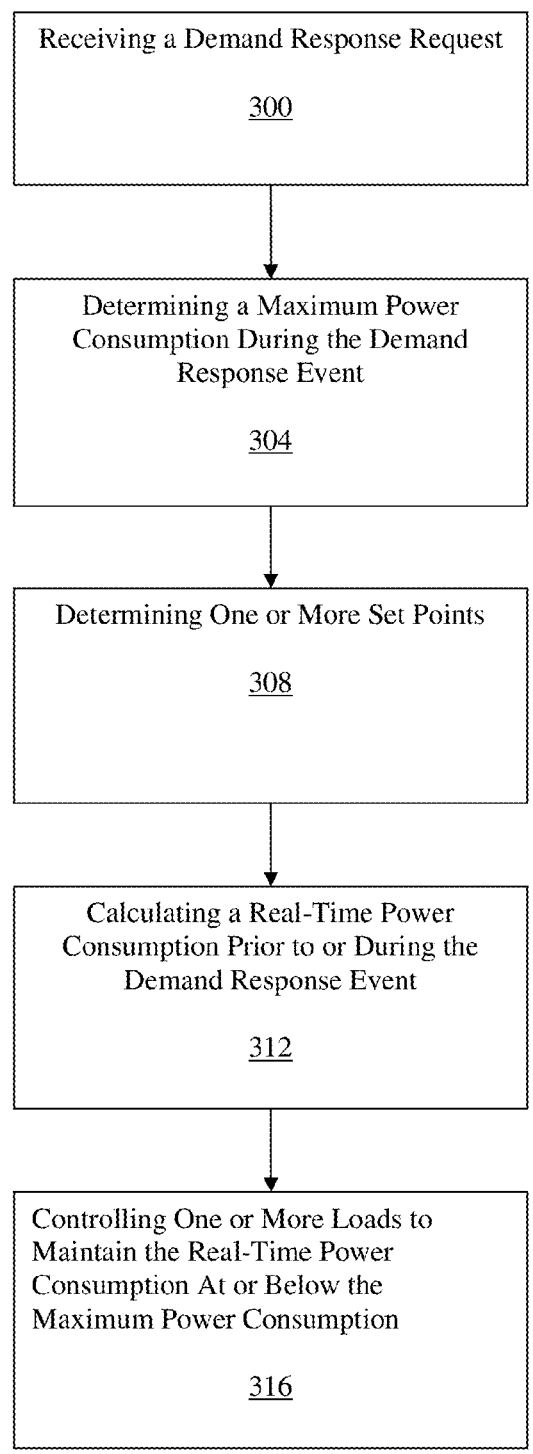
FIG. 3 is a flow chart diagram of one embodiment of a method for providing adaptive demand response for an area.

FIG. 3 shows a flow chart depicting a method for providing adaptive demand response for an area. The operation may be implemented using the system 100 described above. In other embodiments, a different system may be used. The method is implemented in the order shown, but may be implemented in or according to any number of different orders. Additional, different, or fewer acts may be provided. For example, any number of additional demand response requests may be received. As another example, the acts of calculating a real-time power consumption and controlling one or more distributed loads may be performed any number of times, such as, for example, twice during a demand response event or once before and periodically (e.g., multiple times) during a demand response event.

The operation or method includes receiving a demand response request for the area (act 300). The demand response request is indicative of a demand response event for the area. Receiving the demand response request includes receiving the demand response request from an entity associated with an electric grid, such as a grid 132.

The demand response event corresponds to a reduction in power consumption or energy usage (i.e., demand response) over, during, or for a specified amount of time (e.g., 1, 2, 8 hours). In other words, the demand response event includes a load shedding goal (e.g., 50 kW) over, during, or for the specified amount of time. Demand response events often correspond to a reduction in power consumption or energy usage for a specified amount of time during peak periods of energy usage.

The operation or method includes determining, based on the response request, a maximum power consumption for the area during the demand response event (act 304). The maximum power consumption is determined prior to the demand response event. The determined maximum power consumption is the maximum power that may be consumed while the load shedding goals of the demand response event are still satisfied. Determining the maximum power consumption and a typical or current power usage indicates how much energy consumption must be reduced in the area to comply with the load shedding goal or requirement of the demand response event.

The operation or method includes determining or calculating, prior to the demand response event, one or more set points for the area during the demand response event (act 308). The one or more set points are determined based on the maximum power consumption. The one or more set points are also determined based on (i) relevant information or data, such as user preferences, activity schedule information, and/or other information or data, obtained from the one or more devices, systems, and/or equipment 170, (ii) information or data, such as temperature or humidity level, from one or more sensors positioned or located in the area (e.g., in one or more of the control zones), and/or (iii) weather data, such as forecast information, for the area.

Determining the one or more set points for the area generally includes determining the one or more set points using an optimization algorithm. Determining includes determining one or more set points for one or more HVAC systems 116 in the area, such as one or more temperature, pressure, humidity, and other set points for the one or more HVAC systems 116. The one or more set points for the one or more HVAC systems 116 are determined prior to the demand response event. In some embodiments, the one or more set points for the one or more HVAC systems are calculated one day prior to the demand response event. In other embodiments, however, the one or more set points may be calculated at a different time prior to the demand response event.

The operation or method includes calculating or measuring a real-time power consumption for the area (act 312). The real-time power consumption for the area may be calculated prior to or during the demand response event. The real-time power consumption may be calculated by reading one or more meters in the area.

The operation or method further includes controlling, when the real-time power consumption exceeds the maximum power consumption, one or more loads in the area to maintain the real-time power consumption at or below the maximum power consumption (act 316). Controlling is performed prior to and/or during the demand response event. Controlling one or more loads may include controlling one or more distributed loads in the area, such as one or more plug-in loads and/or one or more central lighting systems in the area. Controlling the one or more distributed loads includes controlling the one or more distributed loads based on occupancy information, user preferences, user input, an activity schedule, or combinations thereof. Controlling the one or more central light systems in the area includes controlling, directly via a controller, such as the controller 104, one or more central lighting systems, such as the one or more central lighting systems 124. The plug-in loads may be associated with systems, devices, and/or equipment, such as the plurality of systems, devices, and/or equipment 170. Controlling the one or more the one or more plug-in loads includes: initiating a bid request to a plurality of gateway controllers, such as the one or more gateway controllers 108, in communication with one or more devices, such as the one or more devices 170, associated with the one or more plug-in loads; receiving, in response to the bid request, information from the plurality of gateway controllers; allocating load shedding to the one or more devices based on this information, the load shedding being equal to the difference between the real-time power consumption and the maximum power consumption; and generating control instructions to the plurality of gateway controllers based on the allocating.

The controller performs various acts described herein. The controller has a processor configured by instructions for providing adaptive demand response based on distributed load control for an area. A non-transitory computer readable storage medium stores data representing instructions executable by the programmed processor. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device. The processor is a single device or multiple devices operating in serial, parallel, or separately. The processor may be a main processor of a computer, such as a laptop or desktop computer, or may be a processor for handling some tasks in a larger system, such as a graphics processing unit (GPU). The processor is configured by instructions, design, hardware, and/or software to perform the acts discussed herein.

While the invention has been described above by reference to various embodiments, it should be understood that many advantages and modifications can be made without departing from the scope of the invention. It is therefore intended that the foregoing detailed description be regarded as illustrative rather than limiting, and that it be understood that it is the following claims, including all equivalents, that are intended to define the spirit and the scope of this invention.

We claim:

1. A method of providing adaptive demand response for an area, the method comprising:
   receiving a demand response request indicative of a demand response event for the area;
   determining, based on the demand response request, a maximum power consumption for the area during the demand response event;
   determining, by a processor, prior to the demand response event, one or more set points for the area during the demand response event, the one or more set points determined based on the maximum power consumption;
   calculating, by the processor, prior to or during the demand response event, a real-time power consumption of the area; and
   controlling, by the processor, when the real-time power consumption exceeds the maximum power consumption, one or more loads in the area to maintain the real-time power consumption at or below the maximum power consumption,
   wherein controlling the one or more distributed loads comprises controlling one or more plug-in loads in the area,
   wherein controlling the one or more plug-in loads comprises initiating a request to a plurality of gateway controllers in communication with one or more devices associated with the one or more plug-in loads;
   receiving, in response to the request, first bid information from a first gateway controller of the plurality of gateway controllers, wherein the first bid information includes occupancy information obtained through occupancy or motion sensors;
   receiving, in response to the request, second bid information from a second gateway controller of the plurality of gateway controllers, wherein the second bid information includes occupancy information obtained through occupancy or motion sensors;
   calculating required load shedding equal to the difference between the real-time power consumption and the maximum power consumption;
   allocating the calculated load shedding between the first gateway controller and second gateway controller based on the first and second bid information;
   generating control instructions to the plurality of gateway controllers based on the allocating.

2. The method of claim 1, wherein controlling the one or more loads comprises controlling one or more distributed loads based further on user preferences or an activity schedule.

3. The method of claim 2, wherein controlling the one or more distributed loads comprises controlling one or more plug-in loads and one or more central lighting systems in the area.

4. The method of claim 2, wherein controlling the one or more distributed loads comprises controlling one or more central lighting systems in the area.

5. The method of claim 1, wherein the one or more plug-in loads are from one or more computers or lights not part of a central lighting system in the area.

6. The method of claim 1, wherein the first and second bid information further comprises user input.

7. The method of claim 1, wherein calculating and controlling are performed prior to the demand response event and during the demand response event.

8. The method of claim 1, wherein calculating and controlling are performed at least twice during the demand response event.

9. In a non-transitory computer-readable storage medium having stored therein data representing instructions executable by a programmed processor for providing adaptive demand response for an area, the storage medium comprising instructions for:
   receiving a demand response request indicative of a demand response event for the area, the demand response event indicative of a load shedding goal for the area;
   determining, prior to the demand response event, one or more set points for the area based on the load shedding goal;

calculating, prior to or during the demand response event, the real-time power consumption of the area, the real-time power consumption of the area based, at least in part, one the one or more set points for the area; and controlling, when the real-time power consumption does not satisfy the load shedding goal for the area, one or more distributed loads in the area to satisfy the load shedding goal for the area, the controlling comprising by controlling one or more plug-in loads in that area;

by initiating a request to a plurality of gateway controllers in communication with one or more devices associated with the one or more loads;

receiving, in response to the request, first bid information from a first gateway controller of the plurality of gateway controllers, wherein the first bid information includes occupancy information obtained through occupancy or motion sensors;

receiving, in response to the request, second bid information from a second gateway controller of the plurality of gateway controllers, wherein the second bid information includes occupancy information obtained through occupancy or motion sensors; and allocating load shedding between the first and second gateway controller based on the first and second bid information, the load shedding being equal to the difference between the real-time power consumption and a maximum power consumption.

10. The non-transitory computer-readable medium of claim 9, wherein controlling the one or more distributed loads comprises controlling one or more distributed loads based further on user preferences or an activity schedule.

11. The non-transitory computer-readable medium of claim 9, wherein controlling the one or more distributed loads comprises controlling one or more plug-in loads and one or more central lighting systems in the area.

12. A system of providing adaptive demand response for an area, the system comprising:

a first controller; and a plurality of distributed load controllers operatively connected to the first controller, wherein the first controller is configured to:

receive a demand response request indicative of a demand response event for the area;

determine, based on the demand response event, a maximum power consumption for the area during the demand response event;

determine, prior to the demand response event, one or more set points for the area during the demand response event, the one or more set points determined based on the maximum power consumption;

calculate, prior to or during the demand response event, a real-time power consumption by the area;

initiate a request to a plurality of gateway controllers in communication with one or more devices associated with the one or more loads;

receive, in response to the request, first bid information from a first gateway controller of the plurality of gateway controllers, wherein the first bid information includes occupancy information obtained through occupancy or motion sensors;

receive, in response to the request, second bid information from a second gateway controller of the plurality of gateway controllers, wherein the second bid information includes occupancy information obtained through occupancy or motion sensors;

calculating required load shedding for the first and second gateway controllers to maintain real-time power consumption at or below the maximum power based on the first bid information and second bid information;

generate control instructions to control a plurality of loads in the area the control instructions based on the required load shedding for the first and second gateway controllers; and transmit the control instructions to the first and second gateway controllers, and wherein the first and second gateway controllers are configured to receive the control instructions from the first controller and to control a plurality of devices or systems associated with the plurality of distributed loads.

13. The system of claim 12, wherein the first controller is operatively connected to a central lighting system for the area, and wherein the first controller is configured to directly control the central lighting system when the real-time power consumption exceeds the maximum power consumption.

14. The system of claim 12, wherein the first controller is configured to generate the control instructions based further on user preferences, an activity schedule, or combinations thereof.

15. The system of claim 12, wherein the first and second bid information comprises detected occupancy information obtained by requesting user input.

16. The system of claim 12, wherein the control instructions comprise power reduction instructions for the respective gateway controller, a maximum power consumption for the respective gateway controller, or combinations thereof.

17. The system of claim 12, wherein the first controller is configured to generate, when the real-time power consumption exceeds the maximum power consumption, control instructions to control a plurality of loads in the area to maintain the real-time power consumption at or below the maximum power consumption, wherein the control instructions comprise a change of at least one of the set points determined prior to the demand response event.

* * * * *